United States Patent [19]

Patel et al.

[11] Patent Number: 5,684,063
[45] Date of Patent: Nov. 4, 1997

[54] INK PROCESS

[75] Inventors: Raj D. Patel; Guerino G. Sacripante, both of Oakville; Daniel A. Foucher, Toronto, all of Canada

[73] Assignee: Xerox Corporation, Stamford, Conn.

[21] Appl. No.: 664,597

[22] Filed: Jun. 17, 1996

[51] Int. Cl.$^6$ .................. G03G 9/087; C09D 11/10
[52] U.S. Cl. .................. 523/161; 524/289; 524/302; 260/DIG. 38; 430/137; 430/106; 430/114; 106/31.25
[58] Field of Search .................. 523/161; 260/DIG. 38; 524/289, 302; 430/137, 106, 114; 106/20 D, 31.25

[56] References Cited

U.S. PATENT DOCUMENTS

| | | | |
|---|---|---|---|
| 4,883,714 | 11/1989 | Stockl et al. | 428/412 |
| 4,983,488 | 1/1991 | Tan et al. | 430/137 |
| 4,996,127 | 2/1991 | Hasegawa et al. | 430/109 |
| 5,156,675 | 10/1992 | Breton et al. | 106/22 R |
| 5,290,654 | 3/1994 | Sacripante et al. | 430/137 |
| 5,346,797 | 9/1994 | Kmiecik-Lawrynowicz et al. | 430/137 |
| 5,348,832 | 9/1994 | Sacripante et al. | 430/109 |
| 5,364,462 | 11/1994 | Crystal et al. | 106/22 R |
| 5,527,655 | 6/1996 | Bonham et al. | 430/175 |

*Primary Examiner*—Joseph L. Schofer
*Assistant Examiner*—John J. Guarriello
*Attorney, Agent, or Firm*—E. O. Palazzo

[57] ABSTRACT

A process for the preparation of inks comprised of
  i) flushing pigment into a sulfonated polyester resin, and which resin possesses a degree of sulfonation of from between about 2.5 and about 20 mol percent;
  ii) dispersing the pigmented polyester resin in water at a temperature of from about 40° C. about 95° C. by a polytron shearing device operating at speeds of from about 100 to about 5,000 revolutions to yield stable pigmented submicron sized particles of from about 5 to about 150 nanometers; and thereafter separating said submicron particles and mixing said submicron particles with water.

19 Claims, No Drawings

INK PROCESS

PENDING PATENT APPLICATIONS

Illustrated in copending application U.S. Ser. No. 08/663,414, filed concurrently herewith, the disclosure of which is totally incorporated herein by reference, is a process for the preparation of toner comprised of i) flushing pigment into a sulfonated polyester resin, and which resin has a degree of sulfonation of from between about 0.5 and about 2.5 mol percent based on the repeat unit of the polymer;

ii) dispersing the resulting pigmented sulfonated polyester resin in warm water, which water is at a temperature of from about 40 to about 95° C., and which dispersing is accomplished by a high speed shearing polytron device operating at speeds of from about 100 to about 5,000 revolutions per minute thereby enabling the formation of toner sized particles, and which particles are of a volume average diameter of from about 3 to about 10 microns with a narrow GSD;

iii) recovering said toner by filtration;

iv) drying said toner by vacuum; and v) optionally adding to said dry toner charge additives and flow aids Illustrated in copending patent application U.S. Ser. No. 08/663,420, filed concurrently herewith, the disclosure of which is totally incorporated herein by reference, is a process for the preparation of toner compositions comprised of i) flushing pigment into a sulfonated polyester resin and which resin has a degree of sulfonation of from between about 2.5 and about 20 mol percent based on the repeat unit of the polymer;

ii) dispersing the resulting pigmented sulfonated polyester resin in warm water, which water is at a temperature of from about 40 to about 95° C., and which dispersing is accomplished by a high speed shearing polytron device operating at speeds of from about 100 to about 5,000 revolutions per minute thereby enabling the formation of toner sized particles, and which particles are of a volume average diameter of from about 3 to about 10 microns with a narrow GSD; adding an alkali halide solution iii) recovering said toner particles by filtration;

iv) drying said toner particles by vacuum; and v) optionally adding to said dry toner particles charge additives and flow aids.

BACKGROUND OF THE INVENTION

The present invention is generally directed to toner processes, and more specifically, to aggregation and coalescence processes for the preparation of toner resins, especially polyesters, and ink compositions thereof. In embodiments, the present invention is directed to the economical in situ, chemical preparation of inks, especially ink jet inks with excellent waterfastness and print quality characteristics that can be used in various printing processes such as thermal ink jet and acoustic ink jet processes. Thermal ink jet printing processes are described in more detail, for example, in U.S. Pat. Nos. 5,169,437 and 5,207,824, the disclosures of which are totally incorporated herein by reference.

In an acoustic or piezoelectric ink jet system, ink droplets are propelled to the recording medium by means of a piezoelectric oscillator. In such a system, a recording signal is applied to a recording head containing the piezoelectric oscillator, causing droplets of the ink to be generated and subsequently expelled through the printhead in response to the recording signal to generate an image on the recording medium. In this printing system, a recording signal is converted into a pulse by a signal processing means, such as a pulse converter, and then applied to the piezoelectric oscillator. A change in pressure on the ink within an ink chamber in the printhead caused by the recording signal results in droplets of ink being ejected through an orifice to a recording medium. Such an ink jet system is described in more detail, for example, in U.S. Pat. No. 4,627,875, the disclosure of which is totally incorporated herein by reference.

In these and other ink jet recording processes, it is necessary that the ink being used meet various stringent performance characteristics. These performance characteristics are generally more stringent than those for other liquid ink applications, such as for writing instruments (a fountain pen, felt pen, and the like). In particular, the following conditions are generally desired for inks utilized in ink jet printing processes:

(1) the ink should possess liquid properties, such as viscosity, surface tension and electric conductivity, matching the discharging conditions of the printing apparatus, such as the driving voltage and driving frequency of a piezoelectric electric oscillator, the form and material of printhead orifices, the diameter of orifices, etc.;

(2) the ink should be capable of being stored for a long period of time without causing clogging of printhead orifices during use;

(3) the recording liquid should be quickly fixable onto recording media, such as paper, film, etc., such that the outlines of the resulting ink dots are smooth and there is minimal blotting of the dotted ink;

(4) the resultant ink image should be of high quality, such as having a clear color tone and high density. The ink image should also have high gloss and high color gamut;

(5) the resultant ink image should exhibit excellent waterfastness (water resistance) and lightfastness (light resistance);

(6) the ink should not chemically attack, corrode or erode surrounding materials, such as the ink storage container, printhead components, orifices, and the like;

(7) the ink should not have an unpleasant odor and should not be toxic or inflammable; and (8) the ink should exhibit low foaming and high pH stability characteristics.

Various inks for ink jet printing processes are known in the art. For example, various ink jet inks are disclosed in U.S. Pat. Nos. 4,737,190 and 5,156,675. Generally, the ink jet inks of the prior art are aqueous inks comprising a major amount of water, a humectant and/or a cosolvent, and a dye. By selecting specific humectants, dyes, or other components, it is possible to adjust the print characteristics of the resultant ink.

U.S. Pat. No. 5,364,462, the disclosure of which is totally incorporated herein by reference, describes dye-based inks that are described as providing improved stability, jetting characteristics, solubility and waterfastness. The aqueous dye-based ink includes a dye and a hydroxyethylated polyethylene imine polymer. The hydroxyethylated polyethylene imine polymer may also be substituted with hydroxypropylated polyethylene imine or epichlorohydrin-modified polyethylene imine polymers. Aprotic solvents, such as dimethyl sulfoxide and tetramethylene sulfone, may also be added to the ink to improve the solubility and stability of the dye solution.

Sulfopolyester resins are known and are generally available commercially from Eastek Inks, a business unit of Eastman Chemical Company. These sulfopolyester resins are suitable for use in water-based inks, overprint lacquers and primers, as described in Kenneth R. Barton, "Sulfopolyesters: New Resins for Water-Based Inks, Overprint Lacquers and Primers", American Ink Maker, pp. 70–72 (October, 1993). The sulfopolyester resins may be prepared by the polycondensation reaction of selected dicarboxylic acids, glycols and sodio sulfoorganodicarboxylic acids or glycols to produce linear structures.

Emulsion/aggregation processes for the preparation of toners are illustrated in a number of patents, the disclosures of which are totally incorporated herein by reference, such as U.S. Pat. No. 5,290,654, U.S. Pat. No. 5,278,020, U.S. Pat. No. 5,308,734, U.S. Pat. No. 5,346,797, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797.

In copending patent application U.S. Ser. No. 536,235, the disclosure of which is totally incorporated herein by reference, there is illustrated a method for forming an ink jet ink composition, comprising (a) combining (1) an emulsion of an emulsifiable polymer resin in an anionic medium with (2) a pigment and a cationic surfactant; and (b) aggregating particles in the mixture of step (a) to a desired particle size, thereby producing a dispersion of aggregated particles. The present invention is directed to the preparation of pigmented submicron particles suitable for ink jet application without the need for aggregation of submicron resin and pigment particles, and the invention process thus avoids the need for surfactants such as anionic or cationic surfactants. The present invention in embodiments comprises preparing (a) a sulfonated polyester resin containing an optimum mole percent of sulfonation groups in which the pigment is flushed into resulting in a resin and pigment flush; and (b) dissipating in warm, or heated water resulting in a dispersion of submicron pigmented particles comprising of resin and pigment particles in water to which a suitable ink vehicle is added to form ink jet inks.

The process of the present invention enables the utilization of polymers obtained by polycondensation reactions, such as polyesters, and more specifically, the sulfonated polyesters as illustrated in U.S. Pat. No. 5,348,832, and U.S. Ser. No. 595,143, the disclosures of which are totally incorporated herein by reference.

SUMMARY OF THE INVENTION

Although numerous ink jet inks are presently available, they generally do not meet all of the above-described requirements, while also providing excellent print quality on plain paper. In particular, the inks generally used in ink jet printing processes, while producing acceptable print quality, do not produce the high print quality that is achieved by using dry toner compositions, such as in electrostatographic imaging processes.

A need continues to exist in the ink jet industry for improved ink jet inks, and processes for producing the same, that satisfy the above-described requirements while providing high quality prints on a wide variety of recording media, including plain paper. Although some currently available ink jet inks may provide waterfast images with better substrate latitude, the inks are unacceptable in that they generally smear and have poor latency and maintainability characteristics. In addition, such inks are generally difficult to manufacture. Thus, there remains a need in the ink jet ink industry for improved black and colored inks that can be easily prepared and can be obtained at a lower cost.

The present invention provides processes for generating ink jet ink compositions that have excellent waterfastness and high print quality on a wide variety of print media, including paper and transparencies. Ink compositions prepared by processes of the present invention also meet end-user requirements, including a wide or variety color gamut, high gloss, lightfastness, high stability, improved drying time, and reduced odor retention and toxicity while being compatible with the ink jet printing environment and apparatus. Ink jet ink compositions prepared by the processes of the present invention also provide significantly improved print quality on plain paper, as compared to other ink compositions. Significantly, the present invention provides ink compositions having improved adhesion of pigments on print media while allowing for a higher loading of colorant in the ink.

In embodiments, the present invention relates to a process for the preparation of ink compositions comprised of i) flushing pigment into a sulfonated polyester resin, and which resin preferably possesses a degree of sulfonation between about 2.5 and about 20, or preferably in embodiments about 3.4 to about 15 mol percent; and ii) dispersing the pigmented polyester resin in water at a temperature of from about 40° C. to about 95° C. by a high speed polytron shearing device operating at speeds of from about 300 to about 5,000 revolutions to yield stable submicron sized particles of from about 5 to about 150 nanometers. The particles formed are then separated and mixed with components, such as ink vehicles like water, to form an ink jet ink.

Flushed sulfonated polyester pigmented resin refers to a flushed pigmented system, and can readily be obtained in pressed cakes from Sun Chemicals. Typically, a flushed pigmented system is prepared as follows. First, a presscake of a pigment is generated from an aqueous pigment dispersion by removing water using techniques, such as filtration, to the extent that a presscake of pigment in water containing 50 to about 70 percent of the pigment solids by weight is obtained. Approximately 50 percent of the presscake is then introduced into a reactor containing molten sulfonated polyester resin, accompanied by a high power to volume mixing for a period of 15 to 30 minutes, whereby the pigment transfers itself spontaneously from the aqueous phase to the organic phase. As the pigment begins to disperse, the remaining 50 percent of pigment presscake is slowly added over a period of an additional 60 to 90 minutes. Alternatively, about 50 percent of the presscake is introduced into a reactor containing a sulfonated resin/solvent, such as toluene, xylene, THF, and the like, solution accompanied by a high power to volume mixing for a period of 15 to 30 minutes, whereby the pigment transfers itself spontaneously from the aqueous phase to the organic phase. As the pigment begins to disperse, the remaining 50 percent of pigment presscake is slowly added over a period of an additional 60 to 90 minutes. The water molecules separating the primary pigment particles and soft agglomerates in the presscake are displaced by or flushed out by the resin chains, ensuring that an excellent dispersion quality of the pigment is maintained. In embodiments, the pigmented polyester resin obtained with the processes of the present invention can easily be dispersed in warm, about 40° C. to about 100° C., water. The polyester flushed pigment mixture can be obtained from Sun Chemicals.

The colorant for the ink jet ink compositions of the present invention may be a pigment, or a mixture of one or more pigments. The pigment may be black, cyan, magenta, yellow, red, blue, green, brown, mixtures thereof, and the like. Examples of suitable black pigments include various carbon blacks, such as channel black, furnace black, lamp black, and the like, such as Levanyl Black A-SF (Miles, Bayer) and Sunsperse Carbon Black LHD 9303 (Sun Chemicals). Colored pigments include red, green, blue, brown, magenta, cyan, and yellow particles, as well as mixtures thereof. Illustrative examples of magenta pigments include 2,9-dimethyl substituted quinacridone and anthraquinone, identified in the Color Index as Cl 60710, Cl Dispersed Red 15, Cl Solvent Red 19, and the like. Illustrative examples of suitable cyan pigments include copper tetra-4-(octadecyl sulfonamido) phthalocyanine, X-copper phthalocyanine pigment, listed in the Color Index as Cl 74160, Cl Pigment Blue, and Anthradanthrene Blue, identified in the Color Index as Cl 69810, Special Blue Xo2137, and the like. Illustrative examples of yellow pigments that can be selected include diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Sunsperse Quindo Magenta QHD 6040 (Sun Chemicals), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments may also be selected.

Various known colorants or pigments together with the polyester resin obtained and present in the toner in an effective amount of, for example, from about 1 to about 65, and preferably from about 2 to about 35 percent by weight of the toner, and preferably in an amount of from about 1 to about 15 weight percent, include carbon black like REGAL 330®; magnetites, such as Mobay magnetites MO8029™, MO8060™; and the like. As colored pigments, there can be selected known cyan, magenta, yellow, red, green, brown, blue or mixtures thereof. Specific examples of pigments include phthalocyanine HELIOGEN BLUE L6900™, D6840™, D7080™, D7020™, cyan 15:3, magenta Red 81:3, Yellow 17, the pigments of copending patent application U.S. Ser. No. 542,373, the disclosure of which is totally incorporated herein by reference, and the like. Examples of specific magenta materials that may be selected as pigments include, for example, 2,9-dimethyl-substituted quinacridone and anthraquinone dye identified in the Color Index as Cl 60710, Cl Dispersed Red 15, diazo dye identified in the Color Index as Cl 26050, Cl Solvent Red 19, and the like. Illustrative examples of specific cyan materials that may be used as pigments include copper tetra(octadecyl sulfonamido) phthalocyanine, x-copper phthalocyanine pigment listed in the Color Index as Cl 74160, Cl Pigment Blue, Anthrathrene Blue, identified in the Color Index as Cl 69810, Special Blue X-2137, and the like; while illustrative specific examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention. All the pigments selected are flushed pigments as indicated herein and not dry pigments.

More specifically, pigment examples include Pigment Blue 15:3 having a Color Index Constitution Number of 74160, magenta pigment Pigment Red 81:3 having a Color Index Constitution Number of 45160:3, and Yellow 17 having a Color Index Constitution Number of 21105.

The invention inks preferably contain 10 parts of pigment for every 3 parts of the polymeric resin which is considered to be the optimum formulation. Other effective amounts of pigment and polymer can be selected provided, for example, that suitable inks result. Also, known additives can be incorporated into the ink such as biocides and the like.

The following Examples are being submitted to further define various species of the present invention. These Examples are intended to be illustrative only and are not intended to limit the scope of the present invention. Also, parts and percentages are by weight unless otherwise indicated.

EXPERIMENTAL

Preparation of Sulfonated Polyesters

Preparation of Linear Highly Sulfonated Polyester:

A linear sulfonated random copolyester resin containing, on a mol percent basis, approximately 0.425 of terephthalate, 0.075 of sodium sulfoisophthalate, 0.45 of 1,2-propanediol, and 0.05 of diethylene glycol was prepared as follows. In a one liter Parr reactor equipped with a bottom drain valve, double turbine agitator, and distillation receiver with a cold water condenser were charged 388 grams of dimethylterephthalate, 104.5 grams of sodium dimethylsulfoisophthalate, 322.32 grams of 1,2-propanediol (1 mole excess of glycols), 49.88 grams of diethylene glycol (1 mole excess of glycols), and 0.8 gram of butyltin hydroxide oxide as the catalyst. The reactor was then heated to 165° C. with stirring for 3 hours whereby 115 grams of distillate were collected in the distillation receiver, and which distillate was comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced from atmospheric pressure to about 260 Torr over a one hour period, and then reduced to 5 Torr over a two hour period with the collection of approximately 122 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer discharged through the bottom drain onto a container cooled with dry ice to yield 460 grams of the sulfonated-polyester resin, copoly(1,2-propylene-diethylene)terephthalate-copoly(sodium sulfoisophthalate dicarboxylate), for example about 3.8 mol percent degree, or amount based, for example, on the polymer repeat segment. The sulfonated-polyester resin glass transition temperature was measured to be 52.9° C. (onset) utilizing the 910 Differential Scanning Calorimeter, available from E. I. DuPont, operating at a heating rate of 10° C. per minute. The number average molecular weight was measured to be 1,684 grams per mole, and the weight average molecular weight was measured to be 3,489 grams per mole using tetrahydrofuran as the solvent.

PREPARATION OF FLUSHED PIGMENTED SULFONATED POLYESTERS

Molten Flushed Process:

To a sample (200 grams) of the above prepared molten polyester (>150° C.) in an explosion proof stainless steel batch mixer reactor equipped with a high power to volume ratio sigma blade was rapidly added 50 percent of a wet pigment presscake, available from Sun Chemicals, which was believed to be comprised of 50 to 70 percent pigment solids by weight. Initial mixing was continued for 15 minutes, after which the remaining 50 percent of the presscake was slowly added to the reaction mixture over a 2 hour period. The reactor was then allowed to cool to 50° C. The water at the top of the reactor was decanted and the remaining water removed by vacuum drying. The polyester was heated to 175° C. and then discharged. The composition of the product prepared by this process was 85 percent of sulfonated polyester and 15 percent of the flushed pigment, cyan 15:3.

Solvent Flushed Process:

To a room temperature, about 25° C., THF solution of the polyester above prepared polyester A (200 grams of resin in 200 milliliters of THF) in an explosion proof stainless steel batch reactor mixer equipped with a high power to volume ratio sigma blade was rapidly added 50 percent of wet pigment presscake, available from Sun Chemicals. Initial mixing was continued for 15 minutes, after which the remaining 50 percent of the presscake was slowly added to the reaction mixture over a 2 hour period. The reactor was then allowed to cool to 50° C.. The water at the top of the reactor was decanted and the remaining water removed by vacuum drying. The pigmented polyester polymer was then heated to about 175° C. and then discharged. The composition of the product prepared by this process was 85 percent of sulfonated polyester and 15 percent of the flushed pigment, cyan 15:3.

PREPARATION OF INK DISPERSIONS

EXAMPLE IA

Using a Molten Flushed Pigmented Sulfonated Polyester

A 200 gram sample of the pigmented polyester prepared by the above molten flushing process was dissipated in 5 minutes by the addition of the cyan 15:3 pigmented sulfonated polyester material, with stirring, to 600 milliliters of hot water (75° C.) yielding stable, pigmented submicron, about 45 nanometers in diameter, sized particles comprised of sulfonated polyester, and pigment with a final pigment loading of 5 percent suitable for ink jet ink applications. The submicron pigmented particles were then formulated with other ink vehicles, and more specifically water, about 98 parts, and was then jetted in an HP 500C. printer showing jettability of such particles. The images generated no smearing when rubbed with water indicating waterfastness. The images were also subjected to a lightfastness test where the images were left under ultraviolet (UV) light for 100 hours, and the images evidenced no color fading.

EXAMPLE IB

Using a Solvent Flushed Pigmented Sulfonated Polyester

A 200 gram sample of the pigmented polyester prepared by the above solvent flushing process was dissipated in 5 minutes by the addition of the material, with stirring, to 600 milliliters of hot water (75° C.) yielding stable, submicron sized (<100 nanometers), comprised of sulfonated polyester and cyan 15:3 pigment with a final pigment loading of 5 percent suitable for ink jet ink applications. These submicron pigmented particles were then formulated with other ink vehicles, and more specifically water, about 97 parts, and the ink was then jetted in an HP 500C. printer showing jettability of such particles. The images generated no smearing when rubbed with water indicating waterfastness. The images were also subjected to a lightfastness test where the images were retained under ultraviolet (UV) light for 100 hours. The images evidenced no fading of image color as visually observed.

Other modifications of the present invention may occur to those skilled in the art subsequent to a review of the present application and these modifications, including equivalents thereof, are intended to be included within the scope of the present invention.

What is claimed is:

1. A process for the preparation of inks consisting essentially of
    i) flushing pigment into a sulfonated polyester resin, and which resin possesses a degree of sulfonation of from between about 2.5 and about 20 mol percent;
    ii) dispersing the pigmented polyester resin in water at a temperature of from about 40° C. to about 95° C. by a polytron shearing device operating at speeds of from about 100 to about 5,000 revolutions per minute to yield stable pigmented submicron sized particles of from about 5 to about 150 nanometers; and thereafter separating said submicron particles and mixing said submicron particles with water.

2. A process in accordance with claim 1 wherein said sulfonated polyester resin is in a molten form and is heated prior to flushing the pigment into the sulfonated polyester resin to obtain a flushed pigmented sulfonated polyester resin.

3. A process in accordance with claim 1 wherein said sulfonated polyester resin is dissolved into solvent prior to flushing the pigment into the sulfonated polyester resin to obtain a flushed pigmented sulfonated polyester resin.

4. A process in accordance with claim 2 wherein the pigment to be flushed is added to said molten sulfonated polyester resin followed by vigorous stirring for a period of from about 10 minutes to about 120 minutes.

5. A process in accordance with claim 1 wherein the polyester is random sulfonated copolyester comprised of, on a mol percent basis, approximately 0.425 of terephthalate/ 0.075 of sodium sulfoisophthalate/0.45 of 1,2-propanediol/ 0.05 of diethylene glycol, and which polyester possesses an $M_w$ of about 3,489, an $M_n$ of about 1,680, and a Tg of about 52.9° C.

6. A process in accordance with claim 1 wherein the pigment is carbon black, magnetite, cyan, yellow, magenta, or mixtures thereof.

7. A process for the preparation of ink compositions consisting essentially of flushing a pigment into a sulfonated polyester resin, and which resin possesses a degree of sulfonation of from about 2.5 to about 20 mol percent, and dispersing the pigmented polyester resin in warm water at a temperature of from about 40° C. to about 95° C.

8. A process in accordance with claim 7 wherein dispersing is accomplished by a high speed polytron shearing device operating at speeds of from about 300 to about 5,000 revolutions per minute.

9. A process in accordance with claim 7 wherein dispersing is accomplished by a high speed polytron shearing device operating at speeds of from about 300 to about 5,000 revolutions per minute to yield stable submicron sized particles of from about 50 to about 150 nanometers.

10. A process in accordance with claim 7 wherein the pigment is carbon black.

11. A process in accordance with claim magnetite the pigment is magnetite, a cyan pigment, a yellow pigment, a magenta pigment, or mixtures thereof.

12. A process in accordance with claim 7 wherein the pigment is a cyan pigment.

13. A process in accordance with claim 7 wherein the pigment is a magenta pigment.

14. A process for the preparation of ink compositions comprised of water and a sulfonated polyester pigment mixture, and which process is comprised of i) flushing a pigment into a sulfonated polyester resin and which resin possesses a degree of sulfonation between about 2.6 and about 20 mol percent;

ii) dispersing the pigmented polyester resin in water at a temperature of from about 40° C. to about 95° C. by a polytron shearing device to yield stable submicron sized particles, and separating said submicron particles therefrom, and thereafter dispersing said particles in water.

15. A process for the preparation of inks consisting essentially of i) flushing pigment into a sulfonated polyester resin, and which resin possesses a degree of sulfonation of from 2.5 to 20 mol percent;

ii) dispersing the pigmented polyester resin in water, which water is at a temperature of from about 40° C. to about 95° C., and wherein dispersing is accomplished by a shearing device, thereby providing pigmented submicron sized particles of from about 5 to about 150 nanometers; separating said submicron particles, and mixing said particles with an ink vehicle.

16. A process in accordance with claim 15 wherein said vehicle is water.

17. A process in accordance with claim 15 wherein said vehicle is water present in an amount of from about 80 to about 98 percent, based on the weight percent total of water and said submicron particles.

18. A process in accordance with claim 1 wherein said degree of sulfonation is from about 3 to about 15 percent.

19. A process for the preparation of inks consisting of i) flushing pigment into a sulfonated polyester resin, and which resin possesses a degree of sulfonation of from between about 2.5 and about 20 mol percent;

ii) dispersing the pigmented polyester resin in water at a temperature of from about 40° C. about 95° C. by a polytron shearing device operating at speeds of from about 100 to about 5,000 revolutions per minute to yield stable pigmented submicron sized particles of from about 5 to about 150 nanometers; and thereafter separating aid submicron particles and mixing aid submicron particles with water.

* * * * *